(No Model.) 2 Sheets—Sheet 1.

J. M. WILLIAMS.
BOILER FEED REGULATOR AND ALARM.

No. 559,555. Patented May 5, 1896.

Witnesses
Lindsay deB. Little
Robert C. Totten

Inventor
John M. Williams
By Kay & Totten
Attorneys (No Model.) 2 Sheets—Sheet 2.
J. M. WILLIAMS.
BOILER FEED REGULATOR AND ALARM.
No. 559,555. Patented May 5, 1896.
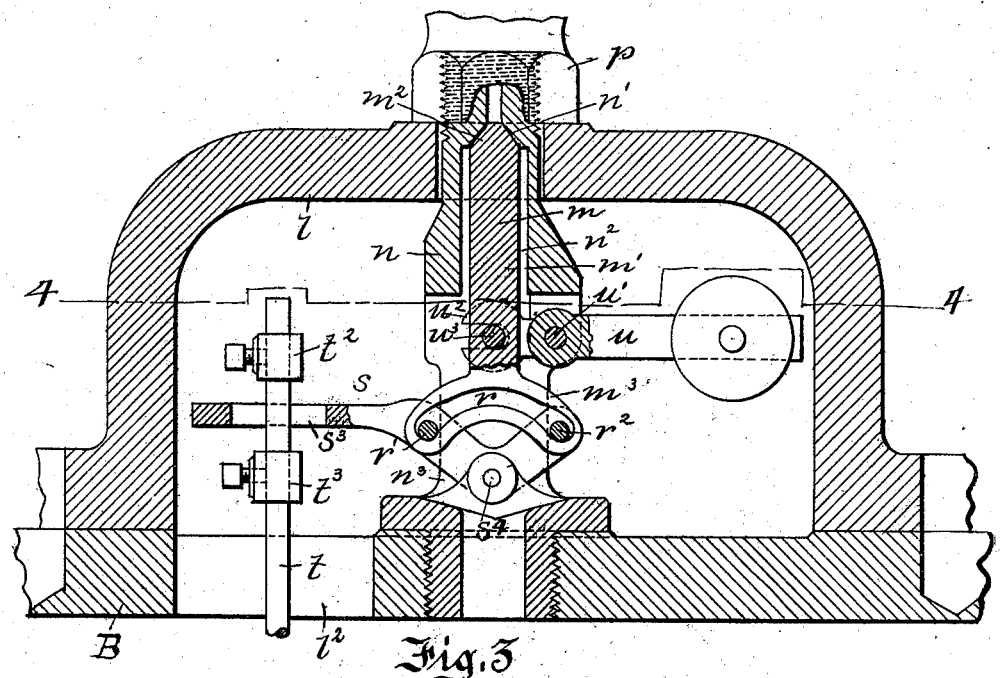
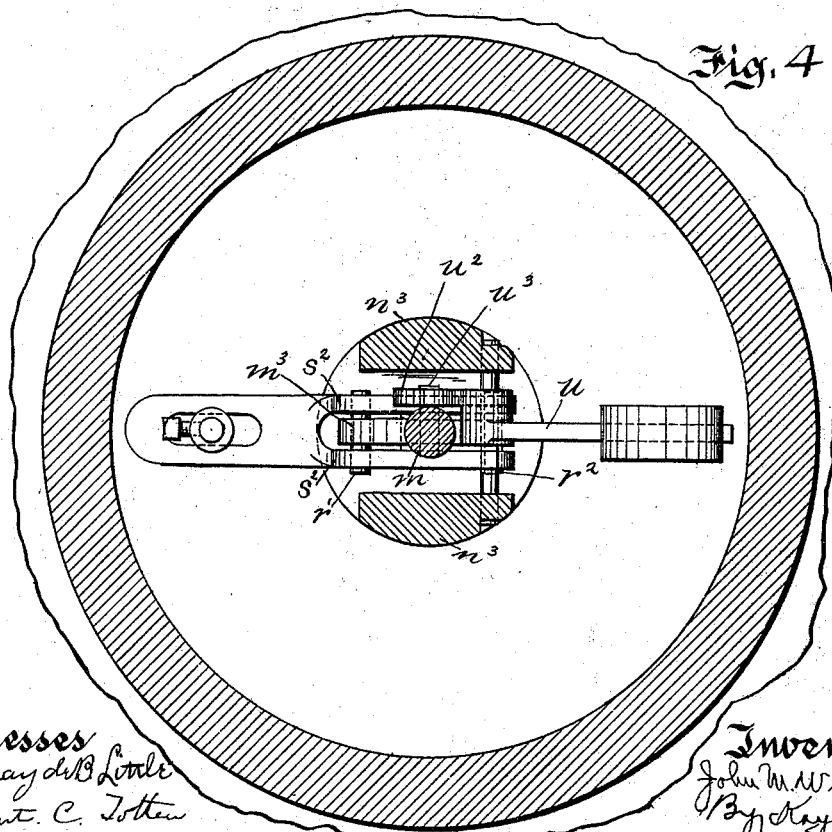
Witnesses
Lindsay deB Little
Robert C. Totten
Inventor
John M. Williams
By Kay & Totten
Attorneys

UNITED STATES PATENT OFFICE.

JOHN M. WILLIAMS, OF PITTSBURG, PENNSYLVANIA.

BOILER-FEED REGULATOR AND ALARM.

SPECIFICATION forming part of Letters Patent No. 559,555, dated May 5, 1896.

Application filed February 4, 1895. Serial No. 537,212. (No model.)

*To all whom it may concern:*

Be it known that I, JOHN M. WILLIAMS, a resident of Pittsburg, in the county of Allegheny and State of Pennsylvania, have invented a new and useful Improvement in Boiler-Feed Regulators and Alarms; and I do hereby declare the following to be a full, clear, and exact description thereof.

My invention relates to combined feed-water regulators and high and low water alarms, its object being to provide an efficient regulator containing all these features, and, in addition to that, to provide a device for regulating the flow to each individual boiler by controlling the flow of water through an individual feed-pipe leading thereto.

A further object of my invention is to regulate the flow of the water by means of a float which is protected from any such disturbance as would result from ebullition of the water were it caused to pass through the chamber containing the float and yet to leave the float free to give the desired control.

My invention consists, generally stated, in the combination of a water-feed pipe having a valve-chamber provided with a side opening, a float-chamber at the side of the valve-chamber and connected thereto, a movable separating-disk between and held in place by the two chambers, a float mounted on a lever in the float-chamber, and a horizontal balanced valve in the valve-chamber having its stem passing through the disk and connected to the float-lever.

It also consists in other improvements more fully hereinafter set forth.

To enable others skilled in the art to make and use my invention, I will describe the same more fully, referring to the accompanying drawings, in which—

Figure 1:
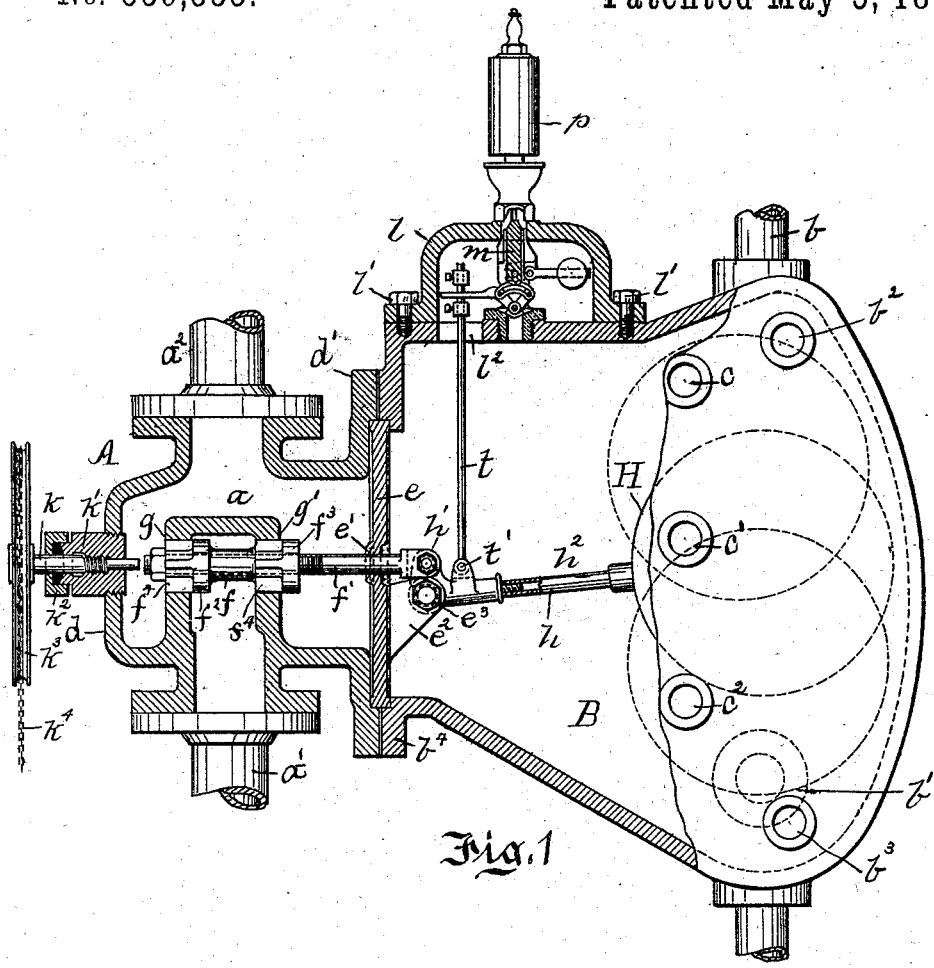
Figure 2:
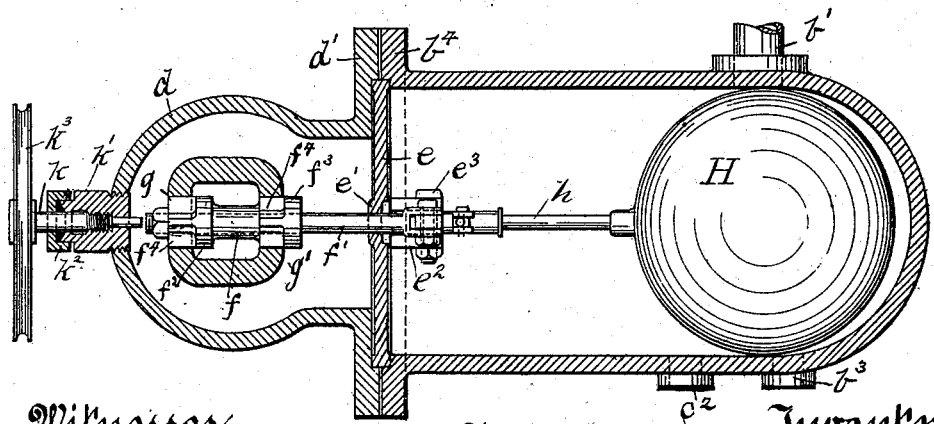

Figure 1 is a side view, partly in section, of the regulator and alarm. Fig. 2 is a cross-section through the balanced valve, the valve being shown in full lines. Fig. 3 is an enlarged sectional view of the alarm-valve and its connections; and Fig. 4 is a cross-section on the line 4 4, Fig. 3.

Like letters of reference indicate like parts in each.

The regulator is composed of two main parts, the feed-pipe A and the float-chamber or casing B.

In the term "feed-pipe" I include the valve-chamber $a$, with which the inlet-pipe $a'$ and outlet-pipe $a^2$ communicate, the whole forming for all practical purposes the feed-pipe, the inlet-pipe of which communicates with any main supply-pipe leading from a feed-pump, while the outlet-pipe leads to any suitable point for the introduction of the water into the boiler, one such regulator being employed for each boiler and controlling the flow of the water into the same, and being secured to the boiler in such way that the float-chamber B can communicate with the steam-space and water-space of the boiler—such, for example, as through the steam-pipe $b$ and the water-pipe $b'$, the latter being shown in dotted lines in Fig. 1 and in full lines in Fig. 2. The float-chamber B has also suitable openings for gage-cocks, as at $c$ $c'$ $c^2$, and any suitable indicator-tube to show the height of the water can be connected to the same at the joints $b^2$ $b^3$. The valve-chamber $a$ is inclosed in a casing $d$ of suitable shape, provided with a side opening and having the flange $d'$ at one side thereof by which it is connected by suitable bolts to the float-chamber B, which is also formed of a casting of suitable shape, and between the two, forming a separation between the chambers, is a movable disk-plate $e$, which is held in place by being clamped between the flange $d'$ of the valve $d$ and the flange $b^4$ of the float-chamber, such disk $e$ being preferably formed of a cast-metal plate, and acting to separate the feed-pipe and its valve-chamber $a$ from the float-chamber B.

The plate $e$ has a central passage $e'$, through which the valve-rod $f'$ of the balanced valve $f$ passes, said balance-valve fitting within such circular valve-seats $g$ $g'$ in the hollow projecting portion $d^2$, which projects from the entrance-pipe $a'$ into the valve-chamber $a$, and in which the valve-seats $g$ $g'$ are formed, the upper end of the hollow projection $d^2$ being closed, as at $d^3$. The valve $f$ has the solid valve portions $f^2$ $f^3$, adapted to enter within the valve-seats $g$ $g'$, respectively, and close the same, and has beyond such solid valve portions the ordinary skeleton guide $f^4$ on each valve portion. Formed in the disk or separating-plate $e$ is the bearing $e^2$ for the float-lever $h$, and it will be seen that said lever $h$, which is pivoted in the bearing by the bolt $e^3$, has the two arms $h'\,h^2$ at an angle to each other, the arm $h'$ connecting directly to the valve-rod $f'$ by means of a pivot-bolt and having provision for play between them according to the swing of the lever, and the arm $h^2$ extending out and carrying the float H. The valve $f$ is thus controlled by the float through the float-lever and the valve-rod, which extends through the disk $e$, and as the feed-water passes through the feed-pipe and the water rises and falls in the boiler the float regulates the position of the valve without fear of disturbance of the water in the float-chamber by that passing through the feed-pipe, the central opening $e'$ in the disk $e$ fitting around the valve-rod so closely that little or no water can pass through the joint, though the valve-rod has a free movement.

Though the leverage of the float upon the valve is such as would practically in all cases prevent the sticking of the valve, to provide positively for the movement of the valve in case it should stick or for the raising of the height of the water in the boiler, I employ the valve-operating shaft $k$ in direct line with the valve $f$ and mounted within the bearing $k'$, which is screwed into the valve-casing $d$ and has an interior threaded face therein, in which the threaded face of the shaft $k$ engages, the bearing also having a stuffing-box $k^2$, through which the shaft passes to prevent leakage. At the end of the shaft $k$ is the grooved operating-wheel $k^3$, over which a chain $k^4$ passes, so that, in case the valve sticks, by turning the shaft and by means of the threaded faces of the bearings and the shaft the shaft can be forced against the balanced valve $f$ and force it off its seat. But little movement is required for this shaft, it only being necessary to provide for the actual opening of the valve where the float itself does not operate to do so.

To combine with the feed-water regulator a high and low water alarm, I employ the following mechanism: Secured at the float-chamber of casing B by bolts $l'$ is the cap $l$, which contains the alarm-valve $m$, above which is the whistle or alarm $p$, the float-chamber B communicating with the interior of the cap $l$ by one or more passages $l^2$. The valve-casing $n$ has the seat $n'$, against which the alarm-valve $m$ is seated, and said seat $n'$ opens directly into the whistle $p$, suitable space being left between the interior of the valve-casing $n$ and the valve itself to permit the steam to pass directly to said seat $n'$ either by an enlargement of the central passage $n^2$ in the valve-casing or by ribs upon the valve itself. The valve is formed of the stem $m'$, the upper end of which conforms in shape to the valve-seat $n'$, as at $m^2$, while the base of said stem forms a yoke $m^3$, having one or more curved or diagonal slots therein, with which the alarm-valve lever $s$ engages, said lever $s$ being mounted in the valve-case between the side standards $n^3$ thereof below the central passage $n^2$, and the inner end of the lever $s$ being preferably made bifurcated, as shown in Fig. 4, having the two arms $s^2$, fitting on each side of the yoke $m^3$ of the valve. In the lever $s$ are pins or stops $r'\,r^2$, which normally rest at the ends of the curved slot $r$, as shown in Fig. 4, the curved slot being preferably formed as the arc of a circle from the pivot-point $s^4$ of the alarm-lever $s$, and the pins $r'\,r^2$ not quite filling said slot, but having sufficient play to permit of the movements hereinafter described. The outer end of the alarm-lever $s$ has the slot or passage $s^3$, through which the tappet-rod $t$ passes, said rod being connected by suitable pivot-joint to the float-lever $h$ at $t'$ and extending upwardly through the opening $l^2$ into the interior of the cap $l$ and carrying on the same the tappets $t^2\,t^3$, which are adapted to strike against the alarm-lever $s$ and cause the movement of the same, so as to give the alarm when the water falls too low in the boiler or is brought to too great a height therein by either one of the tappets engaging with the levers. To hold the valve $m$ to its valve-seat $n'$, I employ the weighted lever $u$, pivoted in the valve-body, as at $u'$, and having a forked inner end $u^2$, engaging with a pin $u^3$, as shown in dotted lines, on the valve-stem $m'$ and acting to hold the valve to its seat, except where it is moved by the tappets or tappet-rod.

I will now describe the operation of the combined regulator and alarm, so that it may be more clearly understood. The apparatus is secured to the face of the boiler, the inlet-pipe $a'$ communicating with the general supply-pipe extending from the supply-pump and the outlet-pipe $a^2$, leading into the boiler, while the float-chamber B communicates with the interior of the boiler through the steam-pipe and water-pipe above referred to, one such apparatus being secured to each boiler and controlling the flow of water into the same, so that the supply of each boiler is independent of any other, and the difficulties heretofore experienced, where a battery of boilers are supplied from one pump, is overcome. The valve $f$ is properly balanced in the valve-chamber $a$ in the supply-pipe A, and as the water flows through the supply-pipe A and enters the boiler the water flows into the float-chamber and causes the float to rise or lower according to the water-line, which, through the float-lever $h$, operating the valve $f'$, closes or opens the balance-valve $f$, and the water flows through the valve-chamber A without in any way disturbing or causing ebullition in the float-chamber, as is the case where the water flows directly into the chamber containing the float. In case the supply of water is for any reason shut off, so that the balance-valve does not operate, and the water-line becomes too low in the boiler and in the float-chamber B, the tappet-rod $t$ is drawn down by the float-lever and it draws upon the alarm-lever $s$, which, through the pin $r'$ on the curved slot, acts upon the valve $m$ and draws it from its seat $n'$, giving the alarm through the whistle $p$. To sound the high-water alarm, the tappet-rod $t$ is raised until its lower tappet strikes upon the alarm-lever $s$ and moves the same upwardly, when the pin $r^2$ of the alarm-lever strikes against the end of the curved slot $r$ and acts to draw down the alarm-valve $m$ from the seat $n'$ and give the alarm. In case it is found that the balanced valve $f$ in the supply-pipe is stuck and not operating, as would be indicated by such alarms, the valve may be moved in its seat by the shaft $k$, which, by the turning of the wheel $k^3$, is forced against the end of the valve $f$, or the stem projecting through the valve, and so forced off its seat. This shaft $k$ is of especial importance in connection with the balanced valve, where it is desired to increase the water-level of the boiler for any cause, such as where the fires are banked over night and a greater height of water is required in the boiler. By forcing the shaft against the valve and holding it off its seat, even though the float-lever would naturally close it, the supply of water in the boiler can be raised to or above the upper gage-cock—that is, to any height desired—this being very important in the working of the boiler-feed. The float-lever is positive in its action and the float has a very strong leverage acting upon the balanced valve, while the whole apparatus is compact and all ebullition from the feed-water working upon the float is overcome by the separating-disk between the feed-pipe and the float-chamber.

What I claim as my invention, and desire to secure by Letters Patent, is—

1. The combination of a water-feed pipe having a valve-chamber provided with a side opening, a float-chamber at the side of the valve-chamber connected thereto, a movable separating-disk between and held in place by the two chambers, a float mounted on the lever in the float-chamber and a horizontal balanced valve in the valve-chamber having its stem passing through the disk and connected to the float-lever, substantially as set forth.

2. The combination of a water-feed pipe having a balanced valve therein, a valve-chamber at the side of the feed-pipe, a disk separating the float-chamber and the feed-pipe and having a bearing thereon, the valve-stem extending through the disk, a float in the float-chamber, and a float-lever mounted in said bearing, and connected to the valve-stem; substantially as set forth.

3. The combination of a float-chamber, and a float therein, a high and low water alarm valve mounted in a valve-chamber, a tappet-rod connected to the float and operating the alarm-valve, said alarm-valve being formed of a stem mounted within the valve-casing and having a yoke at the lower end containing one or more slots, and an alarm-lever mounted in the valve-body and having pins engaging with said yoke through said slot, substantially as set forth.

4. The combination of a float-chamber and a float therein, high and low water alarm valve mounted in a valve-chamber, a tappet-rod connected to the float and operating the alarm-valve, said alarm-valve being formed of a stem mounted within the valve-casing and having a yoke at the lower end containing a curved slot, an alarm-lever mounted in the valve-casing and having pins engaging with said yoke through said slot, said alarm-lever being mounted in line with the valve-stem and the slot of the yoke being radial from such point of mounting, substantially as set forth.

5. The combination of a float-chamber, and a float therein, a high and low water alarm valve secured in the valve-chamber, a tappet-rod connected to the float and operating the alarm-valve, said alarm-valve being formed of a stem mounted within the valve-casing and having a yoke at the lower end containing one or more slots, and an alarm-lever mounted in the valve-casing, and having pins engaging with said yoke through said slot, and a weighted lever mounted in the valve-casing and engaging with the valve-stem to hold it normally closed, substantially as set forth.

In testimony whereof I, the said JOHN M. WILLIAMS, have hereunto set my hand.

JOHN M. WILLIAMS.

Witnesses:
JAMES I. KAY,
ROBERT C. TOTTEN.